(12) United States Patent
Zhang et al.

(10) Patent No.: US 12,424,632 B1
(45) Date of Patent: Sep. 23, 2025

(54) SILICON-BASED ANODE WATER-SOLUBLE BINDER, PREPARATION METHOD AND APPLICATION THEREOF

(71) Applicant: Kunming University of Science and Technology, Kunming (CN)

(72) Inventors: Yannan Zhang, Kunming (CN); Yiyong Zhang, Kunming (CN); Yingjie Zhang, Kunming (CN); Peng Dong, Kunming (CN); Xue Li, Kunming (CN); Jiyue Hou, Kunming (CN); Wengxiang Ai, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 0 days.

(21) Appl. No.: 19/051,230

(22) Filed: Feb. 12, 2025

(30) Foreign Application Priority Data

Mar. 5, 2024 (CN) .......................... 202410246067.7

(51) Int. Cl.
| | |
|---|---|
| *H01M 4/62* | (2006.01) |
| *H01M 4/04* | (2006.01) |
| *H01M 4/1395* | (2010.01) |
| *H01M 4/38* | (2006.01) |
| *H01M 10/0525* | (2010.01) |
| *H01M 4/02* | (2006.01) |

(52) U.S. Cl.
CPC ......... *H01M 4/622* (2013.01); *H01M 4/0404* (2013.01); *H01M 4/1395* (2013.01); *H01M 4/386* (2013.01); *H01M 4/625* (2013.01); *H01M 10/0525* (2013.01); *H01M 2004/027* (2013.01)

(58) Field of Classification Search
None
See application file for complete search history.

(56) References Cited

FOREIGN PATENT DOCUMENTS

CN 116470054 A 7/2023

*Primary Examiner* — Carlos Barcena
(74) *Attorney, Agent, or Firm* — Bayramoglu Law Offices LLC

(57) ABSTRACT

A silicon-based anode water-soluble binder, a preparation method and an application thereof are provided. Raw materials of the silicon-based anode water-soluble binder of include a high molecular polymer and a low-molecular-weight organic acid. Taking the low-molecular-weight organic acid as a crosslinking agent, the silicon-based anode water-soluble binder can form a mutually crosslinked network structure by simultaneous polymerization of covalent ester bonds and non-covalent hydrogen bonds through in-situ esterification, providing more active sites for silicon anode and bonding, effectively inhibiting the volume expansion of the silicon anode during the charge-discharge cycle, further improving the electrochemical performance of the lithium-ion battery, and building a crosslinking network structure with multi-gradient energy dissipation, and then the prepared negative electrode pole piece and secondary battery have excellent electrochemical performance.

10 Claims, 2 Drawing Sheets

SILICON-BASED ANODE WATER-SOLUBLE BINDER, PREPARATION METHOD AND APPLICATION THEREOF

CROSS REFERENCE TO THE RELATED APPLICATIONS

This application is based upon and claims priority to Chinese Patent Application No. 202410246067.7, filed on Mar. 5, 2024, the entire contents of which are incorporated herein by reference.

TECHNICAL FIELD

The present disclosure relates to the technical field of lithium-ion battery materials, and in particular, to a silicon-based anode water-soluble binder, a preparation method and an application thereof.

BACKGROUND

Silicon (Si) has an extremely high theoretical capacity (4200 mAh $g^{-1}$), which is 11 times that of graphite anode (372 mAh $g^{-1}$), and it has a lower electrochemical window, therefore, it is considered to be a very potential anode material.

However, in the long-term cyclic process, the huge density change between silicon and its discharge products leads to significant volume expansion (about 300%), which further leads to irreversible crushing of the electrode, unstable solid electrolyte interface (SEI) and electrical contact fault between electrode materials. These negative effects eventually lead to the degradation of the negative electrode and the rapid loss of capacity. At present, research on solving the problem of silicon expansion mostly focuses on the nanoization of silicon particles and the composite with carbon-based materials, and the use of high-efficient binders is also an effective solution.

Effective binders aggregate electrode particles together and provide minimal support for electrochemical processes. Polyvinylidene fluoride (PVDF) is a conventional binder. Due to its weak interaction with active substances and relatively high expansion rate in organic electrolytes, PVDF exhibits poor performance on silicon anodes. Therefore, many new types of binders have been explored.

Synthetic polymer binders represented by polyacrylic acid (PAA), polyvinyl alcohol (PVA), and polyacrylonitrile (PAN) are applied to silicon anodes because of their controllable structure and modifiability. In addition, biomass polymer binders have also received great attention due to their biodegradability and natural abundance, such as sodium alginate (SA), carboxymethyl cellulose (CMC), chitosan (CS), guar gum (GG), carrageenan (KG), etc. Compared with synthetic polymer binders, biomass materials with abundant polar groups (hydroxyl, carboxyl, and amino) are easier to form strong interactions with the Si—OH of the $SiO_2$ layer on the silicon particles, thereby improving the stability of the electrode mechanism. However, the above polymers are not sufficient to adapt to large volume changes due to their linear or branched structures, resulting in the electrical isolation of silicon and the resulting unstable SEI formation. Therefore, it is necessary to find a new binder with stronger interchain connections to form a robust binder network.

SUMMARY

An objective of the present disclosure is to provide a silicon-based anode water-soluble binder, a preparation method and an application thereof, the silicon-based anode water-soluble binder forms a mutually crosslinked network structure by in-situ esterification and polymerization, providing more active sites for silicon anodes and the binder, so as to solve the technical problem that the linear polymer binder in existing anode materials can not effectively interact with the silicon particles, thereby effectively inhibiting the volume expansion of silicon anode during charge and discharge cycles, and further improving the electrochemical performance of lithium-ion batteries.

In order to achieve the above purpose, the present disclosure provides the following solutions.

One of the technical solutions of the present disclosure is to provide a silicon-based anode water-soluble binder, and raw materials include: a high molecular polymer containing hydroxyl and carboxyl groups and a low-molecular-weight organic acid.

In some embodiments, a mass ratio of the high molecular polymer and the low-molecular-weight organic acid is 1-9:1-9.

In some embodiments, the high molecular polymer includes at least one of guar gum, xanthan gum, sodium alginate, sodium hyaluronate and carrageenan.

In some embodiments, the low-molecular-weight organic acid includes at least one of malic acid, citric acid, tartaric acid and acetic acid.

In the present disclosure, taking the low-molecular-weight organic acid as a crosslinking agent, bridges are built between molecular chains of the flexible high molecular polymer by covalent ester bonds and non-covalent hydrogen bonds, thereby constructing a crosslinking network structure with multi-gradient energy dissipation.

The second technical solution of the present disclosure is to provide a preparation method of the silicon-based anode water-soluble binder, including the following steps:

after dispersing a high molecular polymer and a low-molecular-weight organic acid uniformly in water, performing a heating and stirring reaction, and then obtaining the silicon-based anode water-soluble binder.

In some embodiments, a mass ratio of a total mass of the high molecular polymer and the low-molecular-weight organic acid to water is 1:9-1:4, preferably 1:9.

In some embodiments, a temperature of the heating and stirring reaction is 60-100° C., a rotating speed of the heating and stirring reaction is 300-800 rpm, and a time of the heating and stirring reaction is 6-12 h.

In the present disclosure, taking water as a solvent and the high molecular polymer and the low-molecular-weight organic acid as solutes, the binder is prepared by heating and stirring reaction, wherein heating and stirring can promote the formation of strong covalent ester bonds between carboxyl groups of a cross-linking agent molecule and hydroxyl groups of the water-soluble high molecular polymer, thereby crosslinking to the water-soluble polymer molecular chain.

The third technical solution of the present disclosure is to provide an application of the silicon-based anode water-soluble binder in preparing lithium-ion batteries.

The fourth technical solution of the present disclosure is to provide a negative electrode pole piece, the negative electrode pole piece is made of a current collector and an anode slurry loaded on the current collector; and the anode slurry is made by mixing an anode active material, a conductive additive and the silicon-based anode water-soluble binder.

In some embodiments, the anode active material includes one of nano-silicon particles, silicon carbon particles and silicon monoxide particles, preferably nano-silicon particles.

In some embodiments, the conductive additive includes one of Super P®, graphene and Ketjen Black® preferably Super P®.

In some embodiments, a mass ratio of the anode active material, the conductive additive and the silicon-based anode water-soluble binder in the anode slurry is 60-80:5-30:5-20.

The fifth technical solution of the present disclosure is to provide a preparation method of the negative electrode pole piece, including the following steps:

mixing an anode active material, a conductive additive and a silicon-based anode water-soluble binder uniformly, coating on surfaces of current collectors, and after drying, obtaining the negative electrode pole piece by roll pressing and slitting.

In some embodiments, a drying temperature is 60-120° C. and a drying time is 8-16 h.

The sixth technical solution of the present disclosure is to provide a secondary battery, including a positive electrode, a separator, an electrolyte and the negative electrode pole piece.

The present disclosure discloses the following technical effects:

the binder of the present disclosure chooses a water-soluble high molecular polymer with high viscosity and a low-molecular-weight organic acid with high reactivity as the main raw materials, and provides more active sites between the binder and silicon particles through covalent ester bonds with strong adhesion and reversible non-covalent hydrogen bonds, so as to realize effective binding of different functional components at molecular level. The binder with a crosslinking network structure has the advantages of a simple preparation process, convenient operation, low cost and large-scale production. By introducing hydroxyl, carboxyl and ester groups into the composite binder, the binder can form stronger hydrogen bonds with the silicon oxide thin layer on the silicon surface; the hydrogen bonds are tightly bound to silicon nanoparticles to form a current collector, which can effectively reduce the volume expansion of silicon, and improve the electrochemical performance of nano-silicon simultaneously, thereby improving the electrochemical performance of the negative electrode pole piece and secondary battery prepared from this method.

BRIEF DESCRIPTION OF THE DRAWINGS

The drawings forming part of the present application are used to provide further understanding of the present application. The schematic embodiments and descriptions of the present application are used to explain the present application, but they do not constitute an improper limitation of the present application. In the drawings.

DETAILED DESCRIPTION OF THE EMBODIMENTS

Figure 1:
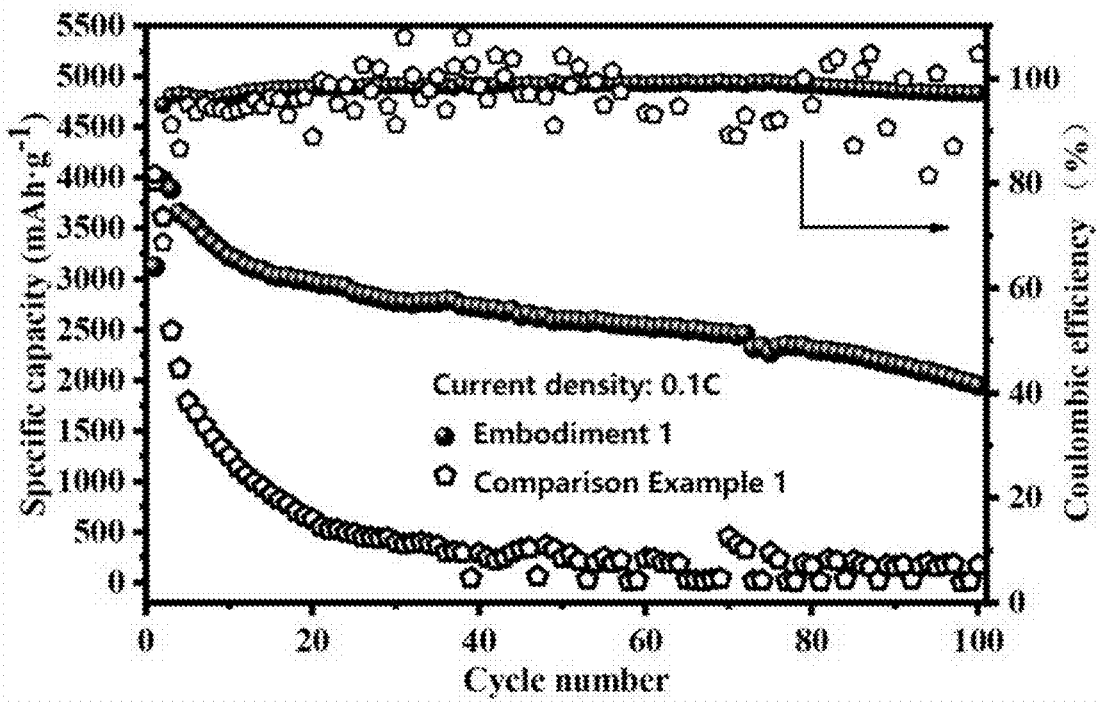
FIG. 1 shows a comparison of a cycle stability of secondary batteries prepared by Embodiment 1 and Comparison Example 1.

A variety of exemplary embodiments of the present disclosure are described in detail, which should not be considered a limitation to the present disclosure but should be understood as a more detailed description of certain aspects, characteristics and embodiments of the present disclosure.

It should be understood that the terms described in the present disclosure are only used to describe particular embodiments and are not intended to limit the present disclosure. In addition, for a numerical range in the present disclosure, it should be understood that each intermediate value between the upper and the lower limits of the range is also disclosed. Any statement value or intermediate value within the statement range is included in the present disclosure, and any other statement value or each smaller range between the intermediate values in the range is also included in the present disclosure. The upper and lower limits of these smaller ranges can be included or excluded independently.

Unless otherwise specified, all technical and scientific terms used herein have the same meanings as those commonly understood by the conventional technical personnel described in the present disclosure. Although the present disclosure describes only preferred methods and materials, any methods and materials similar or equivalent to those described herein may be used in the implementation or testing of the present disclosure. All the literature references mentioned in the present specification are incorporated by reference to disclose and describe the methods and/or materials related to the literature references. In case of conflict with any incorporated literature, the contents of this instruction shall prevail.

Without deviating from the scope or spirit of the present disclosure, a variety of improvements and changes can be made to the embodiments of the present disclosure, which is obvious to those skilled in the art. Other embodiments obtained from the specification of the present disclosure are obvious to technicians. The specification and embodiments of the present disclosure are only illustrative.

The terms 'comprise', 'include', 'have', 'contain' and so forth used in this article are all open terms, i.e. meaning include but not limited to.

Embodiment 1

Preparation of Silicon-Based Anode Water-Soluble Binder 0.6 g of sodium hyaluronate and 0.4 g of malic acid were added to a weighing bottle, 9 g of water was added to obtain a mixed solution, and the mixed solution was stirred (600 rpm) at 80° C. for 12 h to make the mixed solution fully undergo dissolution reaction, i.e. a silicon-based anode water-soluble binder with a mass concentration of 10% was obtained.

Preparation of Negative Electrode Pole Piece silicon nanoparticles, Super P® and the above silicon-based anode water-soluble binder with the mass concentration of 10% were homogenized according to a mass ratio of 60:30:10, the homogenized slurry was evenly coated on the copper foil, dried at 80° C. for 12 h under a vacuum condition, and roll pressing and slitting were performed, i.e. a negative electrode pole piece was obtained.

Preparation of Secondary Battery

The dry negative electrode pole piece was moved into a glove box, and a lithium sheet was taken as a counter electrode, to assemble a 2016 button battery, wherein a separator was Celgard 2500, an electrolyte was composed of $LiPF_6$ as an electrolytic salt and an EC/DMC/DEC solution with a volume ratio of 1:1:1 (a concentration of $LiPF_6$ is 1M), and FEC with a mass fraction of 5% as an additive, the assembled battery was sealed and left to stand for 10 h, i.e. a secondary battery was obtained.

Embodiment 2

Preparation of Silicon-Based Anode Water-Soluble Binder 0.8 g of sodium hyaluronate and 0.2 g of malic acid were added to a weighing bottle, 9 g of water was added to obtain a mixed solution, and the mixed solution was stirred (600 rpm) at 80° C. for 12 h to make the mixed solution fully undergo dissolution reaction, i.e. a silicon-based anode water-soluble binder with a mass concentration of 10% was obtained.

The preparation of a negative electrode pole piece was the same as that of Embodiment 1.

The preparation of a secondary battery was the same as that of Embodiment 1.

Embodiment 3

0.2 g of sodium hyaluronate and 0.8 g of malic acid were added to a weighing bottle, 9 g of water was added to obtain a mixed solution, and the mixed solution was stirred (600 rpm) at 80° C. for 12 h to make the mixed solution fully undergo dissolution reaction, i.e. a silicon-based anode water-soluble binder with a mass concentration of 10% was obtained.

The preparation of a negative electrode pole piece was the same as that of Embodiment 1.

The preparation of a secondary battery was the same as that of Embodiment 1.

Embodiment 4

Preparation of Silicon-Based Anode Water-Soluble Binder 0.6 g of guar gum and 0.4 g of citric acid were added to a weighing bottle, 9 g of water was added to obtain a mixed solution, and the mixed solution was stirred (600 rpm) at 80° C. for 12 h to make the mixed solution fully undergo dissolution reaction, i.e. a silicon-based anode water-soluble binder with a mass concentration of 10% was obtained.

The preparation of a negative electrode pole piece was the same as that of Embodiment 1.

The preparation of a secondary battery was the same as that of Embodiment 1.

Embodiment 5

Preparation of Silicon-Based Anode Water-Soluble Binder 0.5 g of sodium hyaluronate and 0.5 g of malic acid were added to a weighing bottle, 9 g of water was added to obtain a mixed solution, and the mixed solution was stirred (600 rpm) at 80° C. for 12 h to make the mixed solution fully undergo dissolution reaction, i.e. a silicon-based anode water-soluble binder with a mass concentration of 10% was obtained.

The preparation of a negative electrode pole piece was the same as that of Embodiment 1.

The preparation of a secondary battery was the same as that of Embodiment 1.

Embodiment 6

Preparation of Silicon-Based Anode Water-Soluble Binder 0.5 g of carrageenan and 0.5 g of tartaric acid were added to a weighing bottle, 9 g of water was added to obtain a mixed solution, and the mixed solution was stirred (600 rpm) at 80° C. for 12 h to make the mixed solution fully undergo dissolution reaction, i.e. a silicon-based anode water-soluble binder with a mass concentration of 10% was obtained.

The preparation of a negative electrode pole piece was the same as that of Embodiment 1.

The preparation of a secondary battery was the same as that of Embodiment 1.

Embodiment 7

0.6 g of xanthan gum and 0.4 g of acetic acid were added to a weighing bottle, 9 g of water was added to obtain a mixed solution, and the mixed solution was stirred (600 rpm) at 80° C. for 12 h to make the mixed solution fully undergo dissolution reaction, i.e. a silicon-based anode water-soluble binder with a mass concentration of 10% was obtained.

The preparation of a negative electrode pole piece was the same as that of Embodiment 1.

The preparation of a secondary battery was the same as that of Embodiment 1.

Comparison Example 1

Preparation of Binder 0.5 g of carboxymethyl cellulose and 0.5 g of styrene-butadiene rubber were added to the weighing bottle, 9 g of water was added to obtain a mixed solution, and the mixed solution was stirred (600 rpm) at 80° C. for 12 h to make the mixed solution fully undergo dissolution reaction, i.e. a binder was obtained.

The preparation of a negative electrode pole piece was the same as that of Embodiment 1.

The preparation of a secondary battery was the same as that of Embodiment 1.

Comparison Example 2

A binder was polyvinylidene fluoride.

The preparation of a negative electrode pole piece was the same as that of Embodiment 1.

The preparation of a secondary battery was the same as that of Embodiment 1.

Comparison Example 3

Preparation of Silicon-Based Anode Water-Soluble Binder 1 g of sodium hyaluronate was added to a weighing bottle, 9 g of water was added to obtain a mixed solution, and the mixed solution was stirred (600 rpm) at 80° C. for 12 h to make the mixed solution fully dissolved, i.e. a silicon-based anode water-soluble binder with a mass concentration of 10% was obtained.

The preparation of a negative electrode pole piece was the same as that of Embodiment 1.

The preparation of a secondary battery was the same as that of Embodiment 1.

Comparison Example 4

Preparation of Silicon-Based Anode Water-Soluble Binder 1 g of malic acid was added to a weighing bottle, 9 g of water was added to obtain a mixed solution, and the mixed solution was stirred (600 rpm) at 80° C. for 12 h to make the mixed solution fully dissolved, i.e. a silicon-based anode water-soluble binder with a mass concentration of 10% was obtained.

The preparation of a negative electrode pole piece was the same as that of Embodiment 1.

The preparation of a secondary battery was the same as that of Embodiment 1.

Experimental Example

The constant current electrochemical performance testing was performed on the secondary batteries prepared by Embodiments 1-7 and Comparison Example 1-4 on a charge-discharge tester, wherein a charge-discharge rate was 0.1 C, and a voltage range was 0.01-2 V, and the results were shown in Table 1.

TABLE 1

|  | Initial capacity/ mAh g$^{-1}$ | Capacity after 100 cycles at the rate of 0.1 C/mAh g$^{-1}$ | Capacity retention rate/% |
|---|---|---|---|
| Embodiment 1 | 3982 | 1949 | 48.94 |
| Embodiment 2 | 3654 | 1455 | 39.81 |
| Embodiment 3 | 3579 | 1324 | 36.99 |
| Embodiment 4 | 3408 | 1056 | 30.98 |
| Embodiment 5 | 3706 | 1561 | 40.12 |
| Embodiment 6 | 3395 | 1285 | 37.84 |
| Embodiment 7 | 3199 | 1103 | 34.47 |
| Comparison Example 1 | 3378 | 9 | 0.26 |
| Comparison Example 2 | 3128 | 4 | 0.13 |
| Comparison Example 3 | 3459 | 805 | 23.27 |
| Comparison Example 4 | 3544 | 894 | 2.22 |

It could be seen from the data comparison in Table 1 that, the secondary batteries prepared by the binders prepared by the method of the present disclosure had a higher initial capacity and capacity retention rate compared to the ratio, especially the capacity retention rate, wherein, the secondary battery prepared with the binder of sodium hyaluronate and malic acid mixed in a ratio of 6:4 in Embodiment 1 had the best performance.

FIG. 1 showed a comparison of the cycle stability of secondary batteries prepared by Embodiment 1 and Comparison Example 1. It could be seen from FIG. 1 that the first discharge capacity of the secondary battery prepared by Embodiment 1 was 3982 mAh g$^{-1}$, and after 100 cycles, the discharge capacity was 1949 mAh g$^{-1}$. The cycle performance of the binder with a crosslinking network structure formed by crosslinking copolymerization of sodium hyaluronate and malic acid was significantly superior to that of the sodium carboxymethyl cellulose and styrene butadiene rubber as a silicon anode binder.

Figure 2:
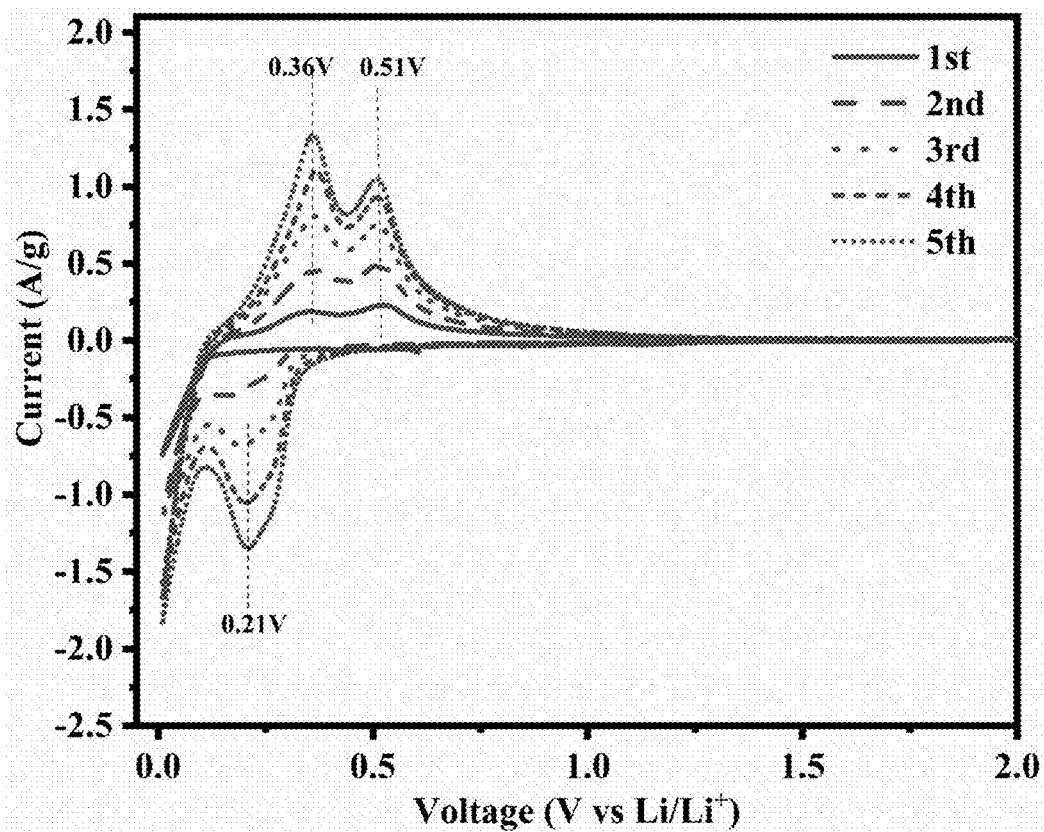
FIG. 2 shows cyclic voltammetry curves of a secondary battery prepared by Embodiment 1.

Under the conditions of an electrochemical window of 0.01-2.0V and a scanning rate of 0.1 mV/s, cyclic voltammetry tests were carried out on the secondary battery prepared by Embodiment 1, and the results were shown in FIG. 2. The secondary battery prepared by Embodiment 1 had obvious redox characteristic peaks of Si lithiation and delithiation, which indicated that the electrode reaction kinetics of the material were good.

Figure 3:
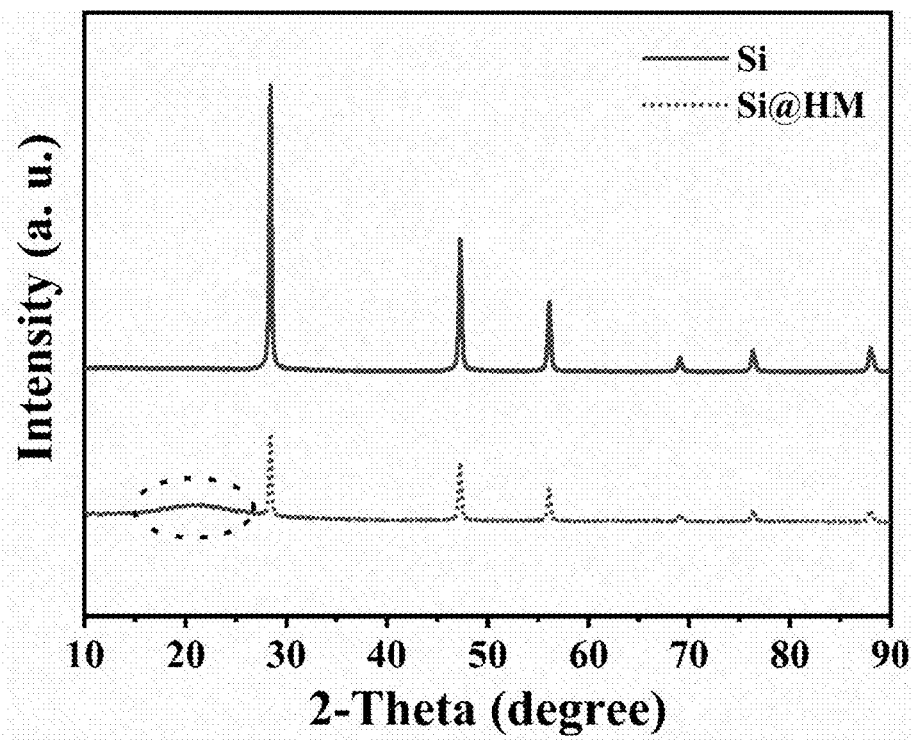
FIG. 3 shows XRD patterns of an anode material prepared by Embodiment 1 and pure silicon.

FIG. 3 showed XRD patterns of the anode material prepared by Embodiment 1 and pure silicon. It could be seen from FIG. 3 that, the small broad peak around 22° of Si corresponded to amorphous natural oxide SiO$_2$, and the peak of the anode material prepared by Embodiment 1 at 80° C. was significantly enhanced, which was attributed to the supramolecular interaction between the binder (HM) made by mixing sodium hyaluronate (HA) and malic acid (MA) and the hydroxylated Si surface.

Figure 4:
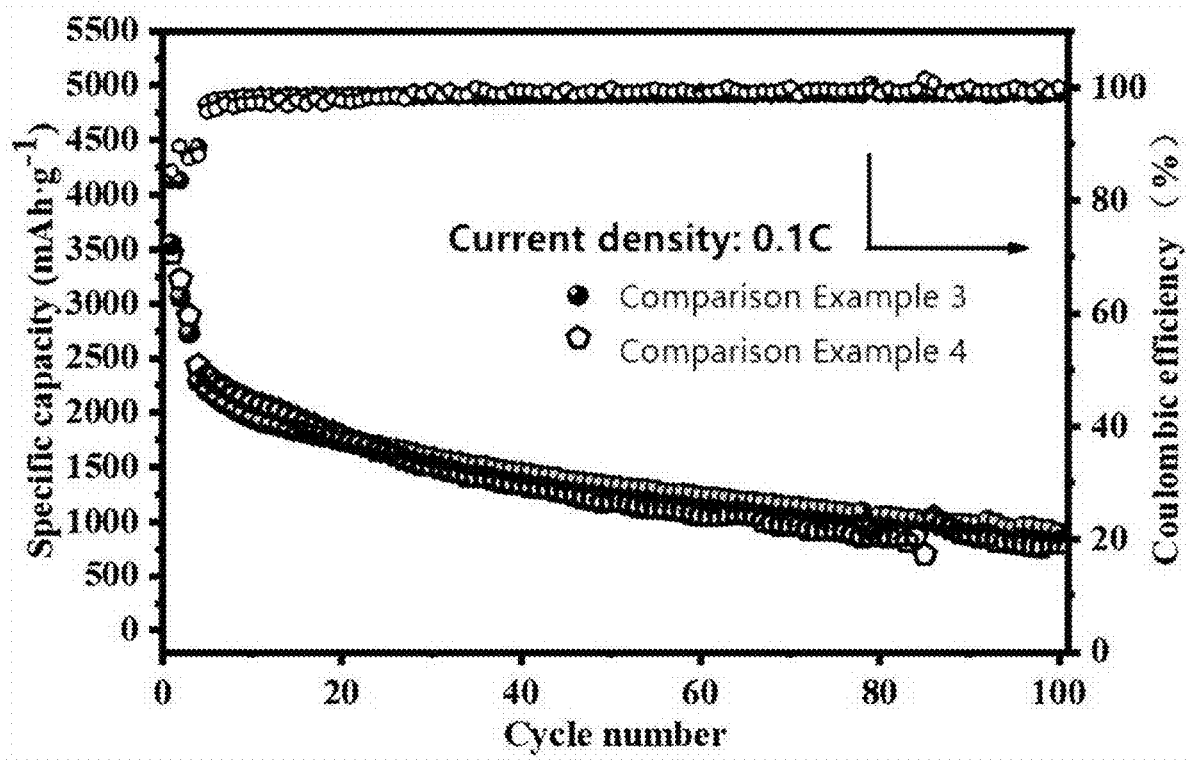
FIG. 4 shows a comparison of a cycle stability of secondary batteries prepared by Comparison Example 3 and Comparison Example 4.

FIG. 4 showed a comparison of the cycle stability of secondary batteries prepared by Comparison Example 3 and Comparison Example 4. It could be seen from FIG. 4 that the initial discharge capacities of the secondary batteries prepared by Embodiment 3 and Embodiment 4 were 3459 mAh g$^{-1}$ and 3544 mAh g$^{-1}$, respectively, and after 100 cycles, the capacities were 805 mAh g$^{-1}$ and 894 mAh g$^{-1}$, respectively. Therefore, the cycle performance of sodium hyaluronate or malic acid alone as a binder was lower than the effect of the combination of the two.

Each embodiment in the description is described in a progressive manner, and each embodiment focuses on its differences from other embodiments, the same and similar parts of each embodiment can be referred to each other.

The above description of the disclosed embodiments enables those skilled in the art to realize or use the present disclosure. Many modifications to these embodiments will be readily apparent to those of ordinary skill in the art, and the generic principles defined herein may be implemented in other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A silicon-based anode water-soluble binder, comprising a high molecular polymer containing hydroxyl and carboxyl groups, a low-molecular-weight organic acid, and water;
    a mass ratio of the high molecular polymer and the low-molecular-weight organic acid is 6:4;
    a mass ratio of a sum of masses of the high molecular polymer and the low-molecular-weight organic acid to the water is 1:9;
    preparation steps of the silicon-based anode water-soluble binder are as follows:
    after dispersing the high molecular polymer and the low-molecular-weight organic acid uniformly in the water, performing a heating and stirring reaction, and then obtaining the silicon-based anode water-soluble binder;
    a temperature of the heating and stirring reaction is 80° C., a rotating speed of the heating and stirring reaction is 600 rpm, and a time of the heating and stirring reaction is 12 h; and
    the high molecular polymer is sodium hyaluronate; and the low-molecular-weight organic acid is malic acid.

2. A preparation method of the silicon-based anode water-soluble binder according to claim 1, comprising the following steps:
    after dispersing the high molecular polymer and the low-molecular-weight organic acid uniformly in the water, performing the heating and stirring reaction, and then obtaining the silicon-based anode water-soluble binder; and
    a mass ratio of a total mass of the high molecular polymer and the low-molecular-weight organic acid to the water is 1:9; the temperature of the heating and stirring reaction is 80° C., the rotating speed of the heating and stirring reaction is 600 rpm, and the time of the heating and stirring reaction is 12 h.

3. A negative electrode pole piece, wherein the negative electrode pole piece is made of a current collector and an anode slurry loaded on the current collector; and
   the anode slurry is composed of an anode active material, a conductive additive, and the silicon-based anode water-soluble binder according to claim 1;
   the anode active material comprises one of nano-silicon particles, silicon carbon particles, and silicon monoxide particles; and
   the conductive additive comprises graphene.

4. The negative electrode pole piece according to claim 3, wherein a mass ratio of the anode active material, the conductive additive, and the silicon-based anode water-soluble binder in the anode slurry is 60-80:5-30:5-20.

5. A preparation method of the negative electrode pole piece according to claim 3, comprising the following steps:
   mixing the anode active material, the conductive additive, and the silicon-based anode water-soluble binder uniformly, coating on surfaces of the current collector, and after drying, obtaining the negative electrode pole piece by roll pressing and slitting.

6. The preparation method according to claim 5, wherein a drying temperature is 60-120° C., and a drying time is 8-16 h.

7. The preparation method according to claim 5, wherein in the negative electrode pole piece, a mass ratio of the anode active material, the conductive additive, and the silicon-based anode water-soluble binder in the anode slurry is 60-80:5-30:5-20.

8. The preparation method according to claim 7, wherein a drying temperature is 60-120° C., and a drying time is 8-16 h.

9. A secondary battery, comprising a positive electrode, a separator, an electrolyte, and the negative electrode pole piece according to claim 3.

10. The secondary battery according to claim 9, wherein in the negative electrode pole piece, a mass ratio of the anode active material, the conductive additive, and the silicon-based anode water-soluble binder in the anode slurry is 60-80:5-30:5-20.

* * * * *